United States Patent [19]

Matsubara

[11] Patent Number: 5,751,765
[45] Date of Patent: May 12, 1998

[54] NON-CONTACT IC CARD, NON-CONTACT IC CARD SYSTEM, AND NON-CONTACT IC CARD DATA COMMUNICATION METHOD

[75] Inventor: Toshiyuki Matsubara, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 609,945

[22] Filed: Feb. 29, 1996

[30] Foreign Application Priority Data

Mar. 3, 1995 [JP] Japan .................. 7-044315

[51] Int. Cl.$^6$ .................................. H04B 1/38
[52] U.S. Cl. .......................... 375/219; 235/380
[58] Field of Search ..................... 375/259, 219, 375/222, 272, 279; 235/380

[56] References Cited

FOREIGN PATENT DOCUMENTS 5143792  6/1993  Japan .
5210768  8/1993  Japan .

*Primary Examiner*—Stephen Chin
*Assistant Examiner*—Bryan Webster
*Attorney, Agent, or Firm*—Leydig, Voit & Mayer, Ltd.

[57] ABSTRACT

A non-contact type IC-card with a simplified circuit arrangement which can select one of the PSK- and FSK-modulation methods at data transmission. A resonance frequency switching section is provided to halve the resonance frequency of a transmission and reception antenna. In the case of the PSK-modulation, the resonance frequency of the transmission and reception antenna is halved during one period of the original frequency at a modulation point so that the phase inverts for the phase modulation. In the case of the FSK-modulation, for the frequency modulation the frequency is switched over in accordance with the variation of the data. A PFSEL switch carries out the switching between both the modulation methods.

14 Claims, 15 Drawing Sheets

NON-CONTACT IC CARD, NON-CONTACT IC CARD SYSTEM, AND NON-CONTACT IC CARD DATA COMMUNICATION METHOD

BACKGROUND OF THE INVENTION

1. Field of the Invention

The present invention relates to a non-contact type IC card for carrying out data transmission and reception through radio waves or the like, a non-contact type IC card system including the IC card, and a data transmission method therefor

2. Description of the Related Art

FIG. 15 is a block diagram schematically showing an arrangement of a known non-contact type IC card system. In FIG. 15, the system is shown as comprising a non-contact type IC card (which will hereinafter be referred to as a card) 1, a reader/writer unit (which will hereinafter be referred to as an R/W) 2 for the transmission and reception of data using radio waves to and from the card 1, and a host computer 3 coupled through a cable C (wire-based signal transmission and reception system) to the R/W 2 for control.

The card 1 includes an antenna 4 for data transmission and reception, a modulating circuit 5 for the modulation of the transmission data, a demodulating circuit 6 for the demodulation of the received data, a rectification and voltage control circuit 7 for rectifying an alternating current signal from the transmission and reception antennas 4 and further for regulating the rectified signal to a desired operating voltage which in turn, is supplied to the respective sections, and an E²PROM 9 for storage of programs and data. Also included in the card 1 is a control section 8 comprising a CPU (not shown), a memory (not shown) for storing programs for operating the CPU, and other functions.

The R/W 2 includes a transmission and reception antenna 21, a modulation and demodulation circuit 22 for the modulation of the data being transmitted and the demodulation of the received data, and a control section for controlling the data transmission. An R/W 2 side CPU and a program for the operation of the CPU are provided in the control section 23 or the host computer 3. For this reason, the R/W 2 and the host computer 3 can be considered as one unit, which is sometimes generally called an R/W.

In operation, the card 1 and the R/W 2 are not electrically coupled to each other through a cable or the like, but rather, the transmission and reception of the data therebetween may be accomplished through radio waves. The R/W 2 comes into connection with the host computer 3 through the cable C and is operable under control of the host computer 3.

A product which rectifies a radio wave from the R/W 2 within the card 1 for the generation of an operating voltage is known. In this instance, the card 1 incorporates the rectifying and voltage control circuit 7, and accepts, through the transmission and reception antenna 4, a radio wave from an external unit such as the R/W 2 so that the rectifying and voltage control circuit 7 produces a desired operating voltage to supply power to the respective internal circuits (functional blocks), thus operating the card 1.

In the card 1, the reception of the data from the R/W 2 is conducted with the transmission and reception antenna 4 and the received data is demodulated in the demodulating circuit 6 and then input into the control section 8. The control section 8 decodes the data from the R/W 2 and implements an operation in accordance with the decoded results.

For example, when an ID code is output to the external, the ID code preprogrammed in the E²PROM 9 serving as a data memory is modulated in the modulating circuit 5 and transmitted through the transmission and reception antenna 4 to the R/W 2 in the form of the radio wave EM. On the other hand, when the data is written in the card 1, the data is written into the E²PROM 9 under the control of the control section 8.

In the R/W 2, under the control of the host computer 3 coupled thereto, the control section 23 controls the modulation and demodulation circuit 22 for the transmission and reception of the data. The modulation and demodulation circuit 22 combines a modulation circuit and a demodulation circuit, and the data transmission is accomplished through the modulation and demodulation circuit 22 from the transmission and reception antenna 21 in both the transmission and reception of data.

In addition, as shown in FIG. 16, there are three typical data modulating methods. The first method is the ASK (Amplitude Shift Keying) modulation method where the data is made to correspond with two kinds of amplitudes, the second method is the FSK (Frequency Shift Keying) modulation method where the data is made to correspond with two kinds of frequencies, and the third is the PSK (Phase Shift Keying) modulation where the data "1/0" are made to correspond with the presence and absence of the phase variation of the radio wave.

Known non-contact type IC cards can generally deal with only one of the above mentioned modulation methods. For instance, a communication unit which performs data transmission and reception in accordance with the FSK modulation method has been disclosed in the Japanese Published Unexamined Patent Application No. 5-210768, and the invention of this disclosure art can realize data transmission and reception on the basis of the FSK modulation method while not realizing data transmission and reception on the basis of the other modulations. Japanese Published Unexamined Patent Application No. 5-143792 discloses a method of transmitting both the data and power through radio waves. However, as well as the first-mentioned prior art invention, this prior art invention adopts the ASK modulation method and therefore can not accommodate the other modulation methods.

As described above, known non-contact type IC cards can generally accept only one of the above described modulation methods, because the circuit arrangement is different for every modulation method and, for accommodating a plurality of modulation methods, the circuit arrangement becomes complicated and large in size. That is, difficulty is experienced when an attempt is made to independently place plural kinds of modulation circuits within the size-limited card, and hence this arrangement has not been realized heretofore. For this reason, the known non-contact type IC card is limited in use to a system having the same modulation method as that of the IC card so that there is a problem with a limitation imposed on the use range.

SUMMARY OF THE INVENTION

The present invention has been developed in order to eliminate the above-mentioned problems, and it is therefore an object of the present invention to provide a non-contact type IC card which is capable of data transmission based on a plural kinds of modulation methods and a system including this card.

Another object of this invention is to provide a data transmission method with a higher reliability for a non-contact IC card system.

In accordance with a first aspect of the present invention, there is provided a non-contact type IC card using a radio wave as a communication medium, comprising antenna means for the transmission and reception of data, modulation means for modulating transmission data in accordance with PSK- and FSK-modulation methods by switching a resonance frequency of the antenna means to suit the transmission data, PSK/FSK switching means for performing a switching operation so that the modulating means conducts one of the PSK- and FSK-modulations, demodulation means for demodulating data received by the antenna means, and control means for controlling the aforesaid means.

According to the first aspect of the present invention, the non-contact type IC card is equipped with a simple circuit comprising a resonance frequency switching section for switching the resonance frequency of the antenna means and a modulation circuit for driving the switching section, and a PFSEL switch of the modulation circuit is only coupled to the VDD or GND. Thus, one card can select one of the PSK modulation and the FSK modulation and further is applicable in a wide range.

In accordance with a second aspect of the present invention, the modulation means further comprises a first modulating section for performing the PSK- and FSK-modulations at a first modulating timing, a second modulating section for performing the PSK- and FSK-modulations at a second modulating timing, and modulation timing switching means for changing the modulation timing by switching a circuit between the first and second modulating sections.

In the non-contact type IC card according to the second aspect of the present invention, the modulation method is selectable (can be selected) between the PSK modulation method and the FSK modulation method, and the modulation timing for the data being transmitted is switchable (can be switched) between a modulation timing at which the modulation is accomplished in response to the inversion of the transmission data and a modulation timing at which the modulation is always accomplished, for example, when the data being transmitted is "0", thus permitting the card to deal with more data communication specifications.

In accordance with a third aspect of the present invention, a non-contact type IC card system comprises a non-contact type IC card having the aforementioned first and second aspects and a reader/writer including antenna means for performing the transmission and reception of data to and from the IC card, modulation and demodulation means for carrying out modulation and demodulation of data transmitted and received through the antenna means, and control means for controlling the aforesaid means.

In the non-contact IC card system according to the third aspect of the present invention, the modulation method in the card is selectable between the PSK modulation method and the FSK modulation method, the modulation timing of the data being transmitted is arranged to be switchable in some type of the card, with the result that the relationship between the R/W and the card becomes more flexible to realize a system more expandable in the card application range.

In accordance with a fourth aspect of the present invention, in the reader/writer of the third aspect, the antenna means comprises an antenna for data transmission and an antenna for data reception.

In the non-contact IC card system according to the fourth aspect of the present invention, the antenna means is divided into the transmission antenna and the reception antenna to offer two kinds of antenna characteristics for the transmission and the reception of data, by which arrangement the transmission antenna can retain the antenna characteristic developing a transmission power while the reception antenna can have an antenna sensitivity subject to a weak or faint radio wave, which can realize a non-contact type IC card system capable of the data transmission and reception accomplishing a long communication distance.

In accordance with a fifth aspect of the present invention, in the third or fourth aspect the reader/writer employs the PSK modulation at data transmission and the non-contact type IC card employs the FSK modulation method at data transmission.

In the non-contact type IC card system according to the fifth aspect of the present invention, the data transmission from the R/W to the card is implemented on the basis of the PSK modulation method, whereas the data transmission from the card to the R/W is achieved on the basis of the FSK modulation method. With this arrangement, since there is no need for a complicated demodulating circuit for the FSK modulation method to be incorporated in the card, the demodulating circuit within the card is designed to correspond with the PSK modulation method, with the result that size reduction and price reduction of the card becomes possible. In addition, since the R/W side carries out the demodulation for the FSK modulation, a non-contact type IC card system can be realized so that even a radio wave with a higher frequency is receivable.

In accordance with a sixth aspect of the present invention, there is provided a data transmission method for a non-contact type IC card system comprising the non-contact type IC card of the first or second aspect and including a rectifying and voltage control circuit for rectifying an alternating current obtained through the antenna to attain a desired operating voltage and further comprising a reader/writer for performing transmission and reception of data to and from the card, wherein the operating voltage is stabilized in the card in such a way that the supply of the radio wave from the reader/writer to the card is continuously conducted even during data transmission from the card to the reader/writer after data transmission from the reader/writer to the card.

In the data transmission method according to the sixth aspect of the present invention, after data transmission from the R/W to the card is completed, the supply of the radio wave to the card is also maintained during data transmission from the card to the R/W so that the operating voltage VDD for the card is always stable, with the result that data transmission and reception becomes possible continuously, which can realize a high-speed and high-reliability data communication system.

Furthermore, in accordance with a seventh aspect of present invention, there is provided a data transmission method for a non-contact type IC card system comprising the non-contact type IC card of the first or second aspect and a reader/writer for performing transmission and reception of data to and from the card, wherein in the reader/writer the reception of a weak radio wave from the card is made easy in such a way that the supply of a radio wave from the reader/writer to the card is stopped after the data transmission from the reader/writer to the card.

The data transmission method according to the seventh aspect of the present invention is particularly effective in a system where the data transmission power from the R/W needs to be large because of a long distance between the R/W and the card or to a system where the transmission power from the card is weak for a long distance. After the data transmission from the R/W to the card, the transmission power from the R/W is stopped during the data transmission from the card to the R/W, thus realizing a data transmission method in which the weak radio wave from the card to the R/W is easily receivable in the R/W side.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
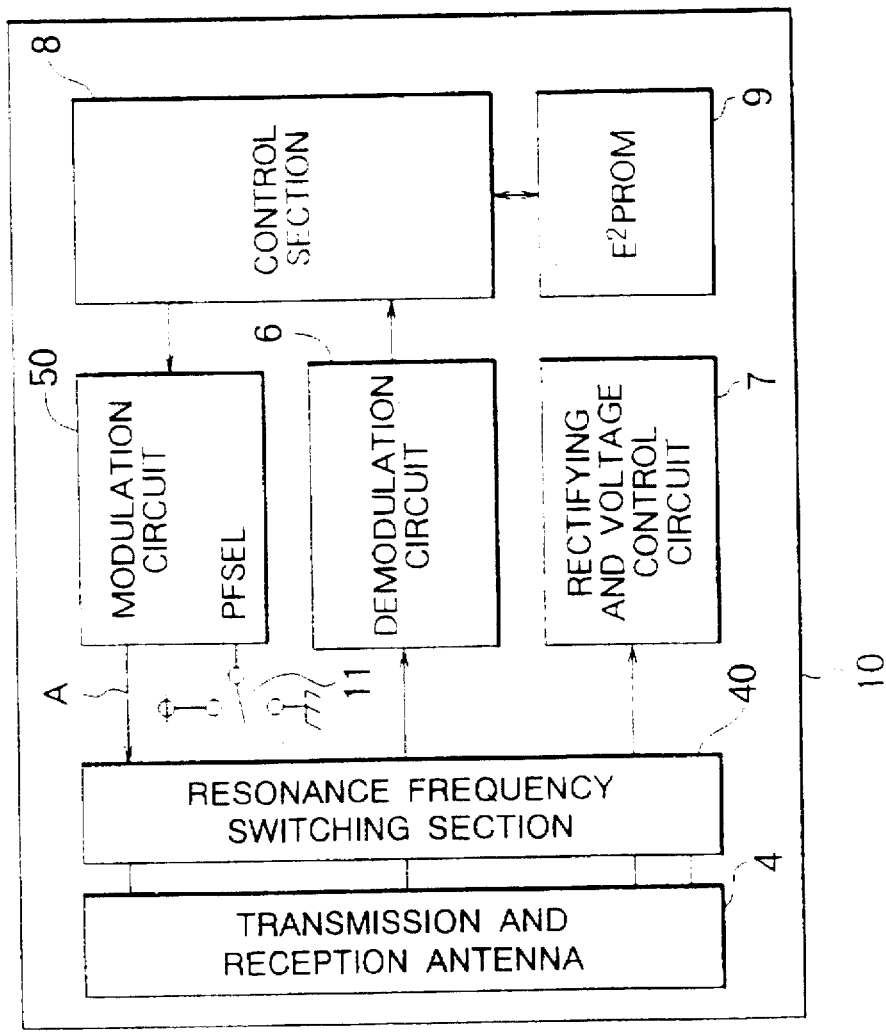
FIG. 1 is a block diagram showing an arrangement of a non-contact type IC card according to an embodiment of this invention.

Referring now to the drawings, a description will be made hereinbelow of embodiments of the present invention.

First Embodiment

FIG. 1 is a block diagram showing an arrangement of a non-contact type IC card according to an embodiment of this invention. In this non-contact type IC card (which will hereinafter be referred to as a card) 10, the modulation method at data transmission is selectable from two kinds of modulation methods: the PSK modulation method and FSK modulation method with a simple circuit arrangement.

In FIG. 1, the card 10 is shown as comprising a transmission and reception antenna 4, a resonance frequency switching section 40 for switching the resonance frequency of the transmission and reception antenna 4, a modulation circuit 50 for driving the resonance frequency switching section 40 to switch the resonance frequency to match data being transmitted so that the transmission data is selectively subjected to one of the PSK modulation method and the FSK modulation method, a PFSEL switch 11 for switching between the PSK modulation and the FSK modulation for the modulation circuit 50, a demodulation circuit 6, a rectifying and voltage control circuit 7, a control section 8 and an $E^2PROM$ 9.

The PFSEL switch 11 has a PFSEL terminal coupled to the VDD or the GND to realize the switching between the PSK modulation method and the FSK modulation method. For example, it is provided as a terminal within the card 10, and its terminal is connected with the VDD or the GND at the manufacturing stage to be provided as a set terminal, or is constructed as a mechanical change-over switch placed on a surface of the card 10 or as a switch comprising a transistor turning on and off in accordance with a command signal from the R/W.

Figure 2:
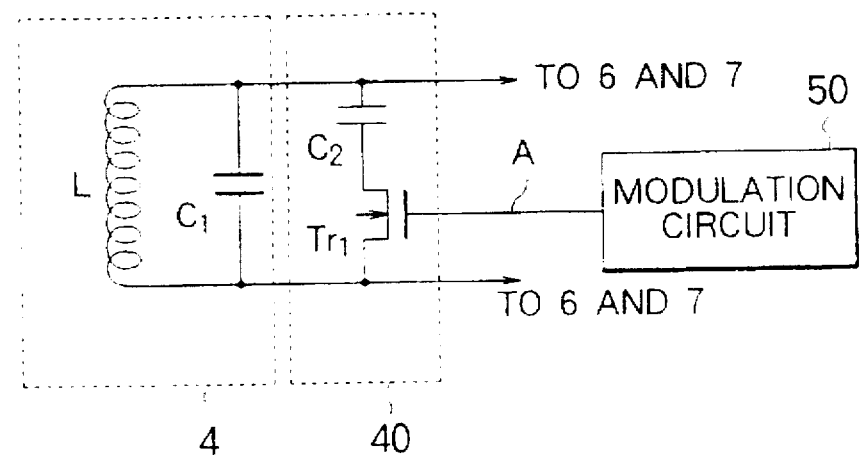
FIG. 2 is an illustration of arrangements of a transmission and reception antenna, a resonance frequency switching section and a modulation circuit of the FIG. 1 card.

FIG. 2 shows arrangements of the transmission and reception antenna 4, the resonance frequency switching section 40 and the modulation circuit 50 of FIG. 1. The resonance frequency f of the transmission and reception antenna 4 depends upon the value of a coil L and a value of a capacitor C1 and is obtainable as $f=1/\{2(\sqrt{LC1})\}$. In the ordinary transmission and reception antenna, the resonance frequency has conventionally been determined by a set of LC for data transmission and reception to and from external points. In the present invention, for realizing the PSK modulation method and FSK modulation method, the resonance frequency switching section comprising a capacitor C2 and switching device Tr1 is provided in order to halve the resonance frequency of the transmission and reception antenna 4.

When the switching device Tr1 comprising a transistor is in the "ON" state, C=C1+C2, and when the switching device Tr1 is in the "OFF" state, C=C1. For example, in a case where the resonance frequency is set to f=400 KHz in a state where the switching device Tr1 is in the "OFF" state, L=350 μH and C1=452.3 pF. In the case where the resonance frequency f is set to 200 KHz being ½ of 400 KHz, if the switching device Tr1 enters the "ON" state, the C value of the resonance circuit becomes C=C1+C2, and f=200 KHz signifies L=350 μH and C=1.81 nF so that C2=1.358 nF.

In this embodiment, the transmission and reception antenna 4 makes up the antenna means, the resonance frequency switching section 40 and the modulation circuit 50 comprise the modulation means, the PFSEL switch 11 comprises the PSK/FSK switching means, the demodulation circuit 6 organizes the demodulation means, and the control section 8 comprises the control means.

Figure 3:
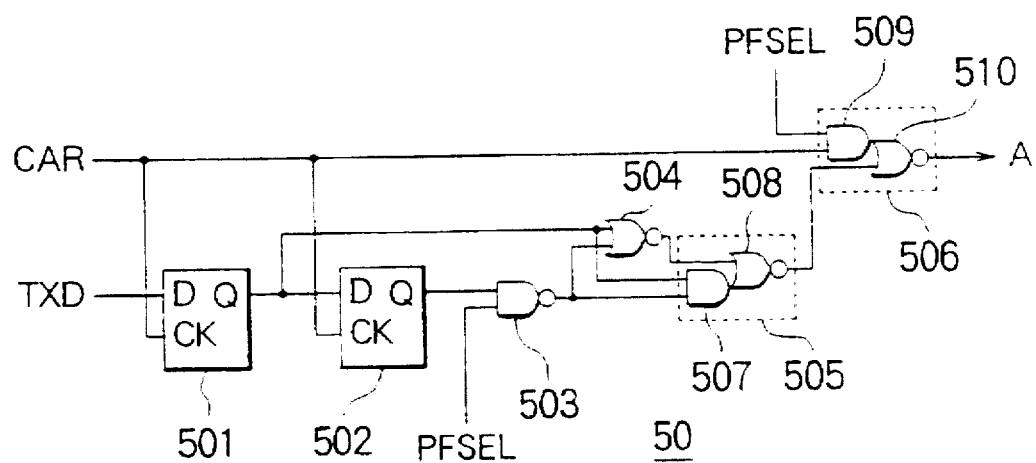
FIG. 3 is an illustration of one example of the modulation circuit in FIG. 1.
Figure 4A:
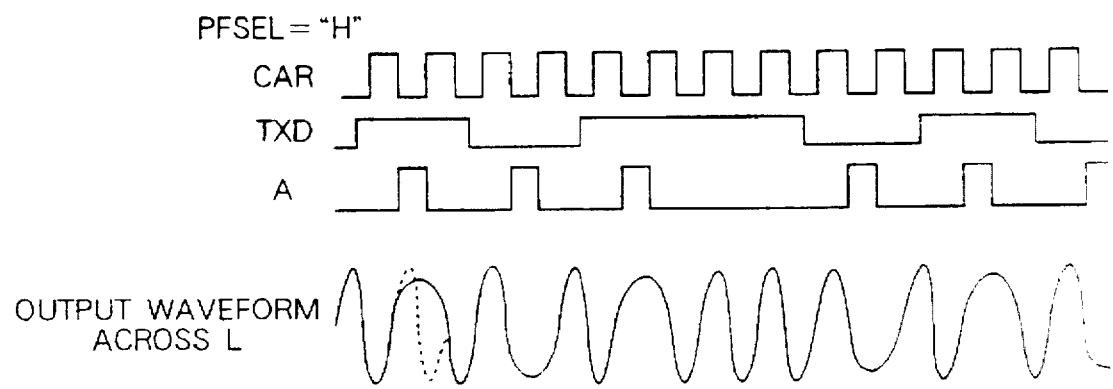
FIGS. 4A and 4B are time charts available for description of an operation of the FIG. 3 modulation circuit.
Figure 4B:
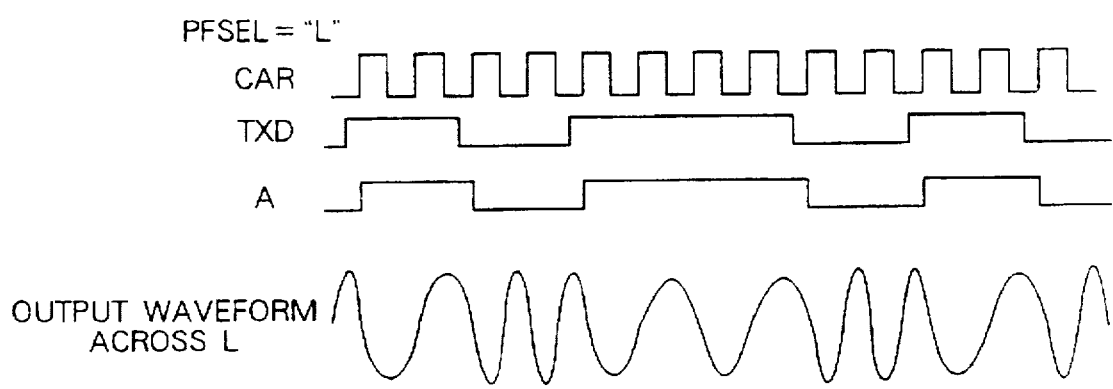

FIG. 3 shows one example of the modulation circuit 50 operative to control the switching device Tr1 of the resonance frequency switching section 40, and FIGS. 4A and 4B illustrate time charts associated with this circuit. In FIG. 3, a carrier signal CAR and a transmission data signal TXD come from the control circuit 8, and the modulation is accomplished at the timing depending upon the carrier signal CAR. An output signal A indicated in FIG. 3 is coupled to a gate input terminal of the switching device Tr1 shown in FIG. 2.

In FIG. 3, reference numeral 501 represents a D-type flip-flop for accepting the transmission data signal TXD in a state with using the carrier signal CAR as a clock signal, numeral 502 designates a D-type flip-flop for accepting the output of the D-type flip-flop 501 in a state with using the carrier signal CAR as a clock signal, numeral 503 depicts a NAND gate for accepting the output of the D-type flip-flop 502 and a PFSEL signal, numeral 504 denotes a NOR gate for receiving the output of the D-type flip-flop 501 and the output of the NAND gate 503, numeral 505 stands for a circuit comprising an AND gate 507 and a NOR gate 508, and numeral 506 signifies a circuit comprising an AND gate 509 and a NOR gate 510.

A description is made below of the operation of the above described circuit. Referring, to FIG. 4A the operation begins with the PSK modulation taken when the PFSEL switch 11 placed in the modulation circuit 50 is connected with the VDD (power supply side). When the transmission data TXD from the control section 8 varies from "L"→"H" or "H"→"L", the output of the modulation circuit 50 represents a signal waveform indicated by A, and when the signal waveform A comes into the "H" state, the switching device Tr1 enters the "ON" state.

As described above, when the switching device Tr1 enters the "ON" state, the resonance frequency of the transmission and reception antenna 4 is set to half of the resonance frequency for when the switching device Tr1 is in the "OFF" state, and hence the output waveform of the transmission and reception antenna 4 takes an output waveform at both ends of the L as shown in FIG. 4A. That is, in the output waveform across the L in FIG. 4A, if the switching device Tr1 does not enter the "ON" condition, the signal waveform becomes as indicated by a dotted line. On the other hand, if the switching device Tr1 enters the "ON" condition, the resonance frequency comes to ½ during one period with respect to the original frequency, and thereafter returns to the original resonance frequency, thus accomplishing the phase modulation.

A description is made below of the FSK modulation taken when the PFSEL switch 11 is connected with the GND (grounded side). FIG. 4B shows signal waveforms for the connection of the PFSEL switch 11 with the GND. With the connection of the PFSEL switch 11 with the GND, the output signal A keeps its signal condition until the state of the signal from the transmission data signal TXD inverts, and hence the ON time of the switching device Tr1 is controlled so that the output waveform from the resonance circuit of the transmission and reception antenna 4 becomes the output waveform across the L as shown in FIG. 4B, thus realizing the frequency modulation.

As described above, in the non-contact type IC card according to this embodiment, only a simple circuit is provided which comprises the resonance frequency switching section for switching over the resonance frequency of the transmission and reception antenna and the modulation circuit for actuating the switching section and the PFSEL switch of this modulation circuit is connected with the VDD or the GND, with the result that one card can deal with both the PSK and FSK modulation methods, which results in realizing a non-contact type IC card applicable in a wide application range.

Second Embodiment

Figure 5:
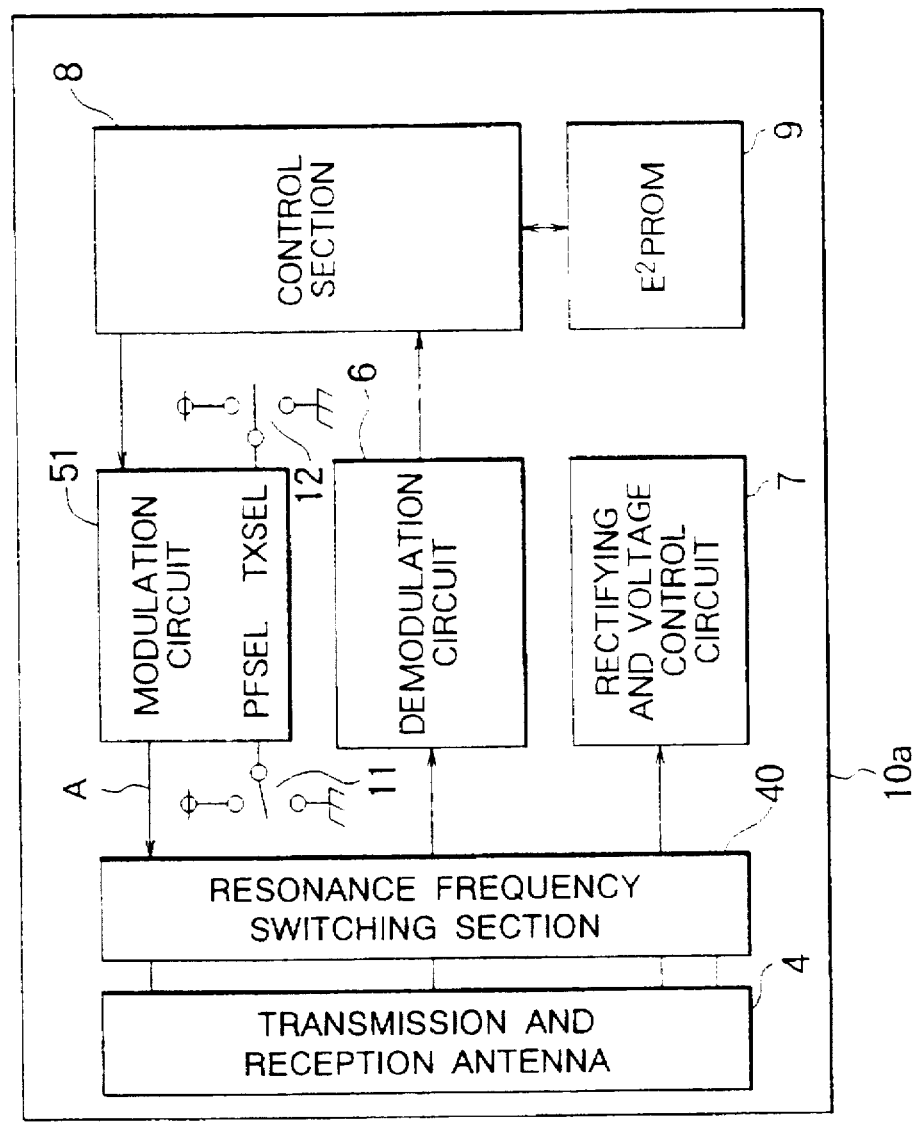
FIG. 5 is a block diagram showing an arrangement of a non-contact type IC card according another embodiment of this invention.

FIG. 5 is a block diagram showing an arrangement of a non-contact type IC card according to another embodiment of the present invention. The card, designated at numeral 10a, can perform the switching operation between the PSK and FSK modulations as well as the above described first embodiment and can alter the timing of the transmission data modulation.

The different points of the card 10a shown in FIG. 5 from the FIG. 1 card 10 relate to the arrangement of a modulation circuit 51, which is described subsequently, and the provision of a TXSEL switch 12 for changing the timing of the modulation of the transmission data. Although in the above-described first embodiment the transmission data modulation is accomplished at the time when the transmission data inverts, the card 10a according to the present invention permits the modulation to be implemented when the transmission data inverts and further the modulation to be always conducted when the transmission data is "0/1". The switching therebetween is achieved through the TXSEL switch 12.

Figure 6:
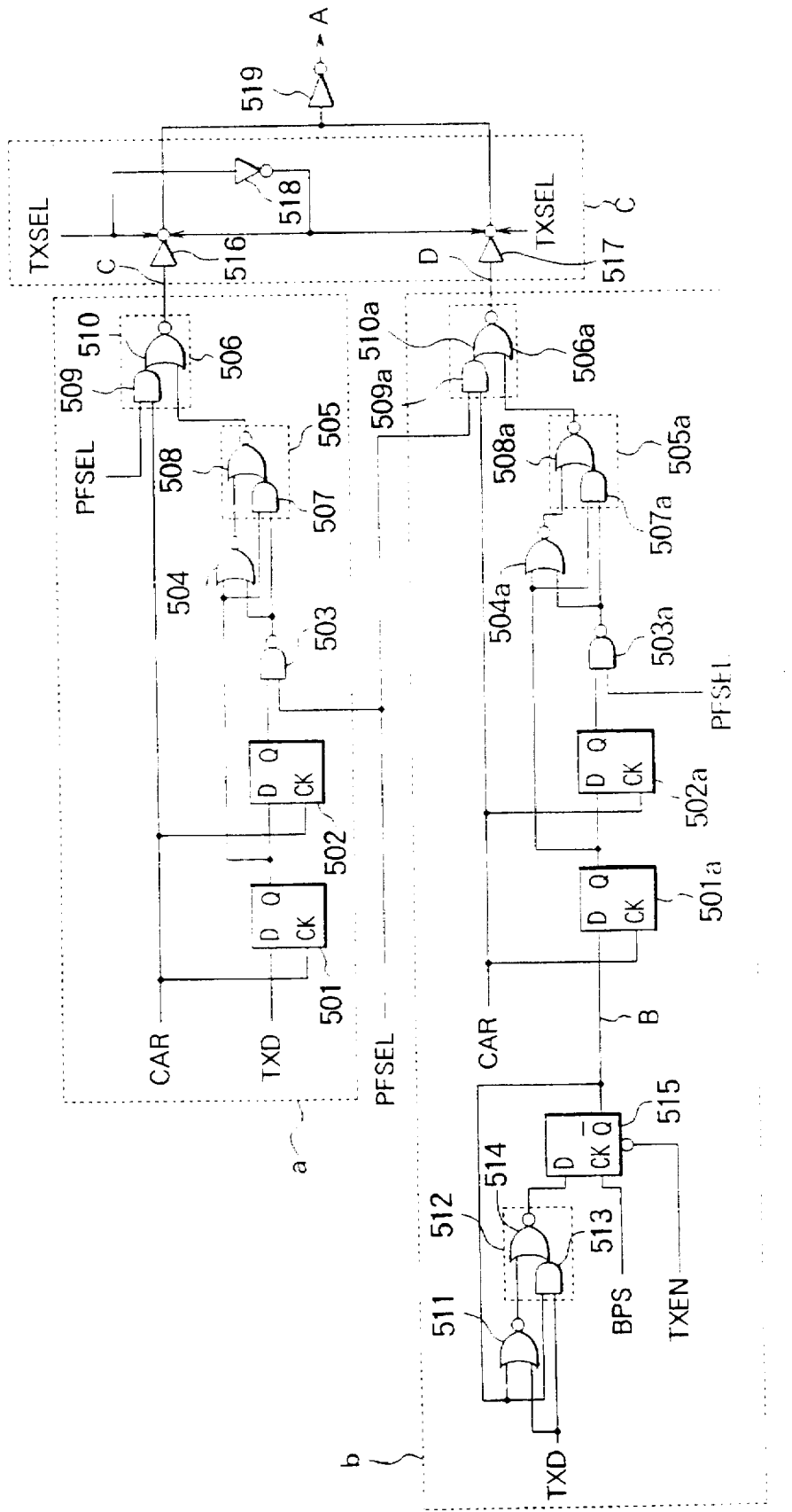
FIG. 6 is an illustration of one example of the FIG. 5 modulation circuit.

One example of the modulation circuit 51 in this embodiment is shown in FIG. 6. In FIG. 6, a section indicated by character a denotes a circuit which carries out the modulation when the transmission data inverts, its arrangement and operation being basically similar to those described with reference to FIG. 3. A section indicated by character b signifies a circuit which always performs the modulation when the transmission data is "0", and a section indicated by character c is a circuit which serves to selectively supply one of the output C of the section a and the output D of the section b to the resonance frequency switching section 40.

In the circuit of section b of FIG. 6, the arrangement comprising components 501a to 510a is basically the same as that of the section a. Further, in FIG. 6, reference numeral 511 represents a NOR gate, numeral 512 designates a circuit comprising an AND gate 513 and a NOR gate 514, and numeral 515 denotes a D-type flip-flop. The NOR gate 511 accepts as inputs the transmission data signal TXD and the output of the D-type flip-flop 515. The circuit 512 receives as inputs the transmission data signal TXD, the output of the NOR gate 511 and the output of the D-type flip-flop 515. Moreover, the D-type flip flop 515 accepts as a clock a division signal BPS attained by dividing the carrier signal CAR and further accepts as an input the output of the NOR gate 514, with its output B being supplied to the D-type flip-flop 501a.

In the event of section c, components 516 to 518 and a component 519 at the output side are inverters, respectively. In the event of section c, when the TXSEL switch 12 is connected with the VDD (power supply side), the output C of the circuit of section a is output from an output terminal indicated by character A, while the output D of the event of section b is taken out from the output terminal A when being connected with the GND (grounded side).

In this embodiment, in FIG. 6, the circuit of section a comprises the first modulation section, the event of section b comprises the second modulation section, and the section coupled with the TXSEL switch 12 comprises the modulation timing switching means.

The operation of circuit of section b is described hereinbelow with reference to the time chart of FIG. 7. The description will be made in terms of the condition that the TXSEL switch 12 is connected with the GND and the PFSEL switch 11 is connected with the VDD. A TXEN signal is a data transmission allowing signal from the control circuit 8 and is coupled to a reset input of the D-type flip-flop 515. While the TXEN signal is "0", the output B of the D-type flip-flop 515 is fixed to "1", and if the TXEN signal turns into "1", it starts to accept the transmission data signal TXD. The division signal BPS is obtainable by dividing the carrier signal CAR, and serves as a reference clock used in the case of varying the transmission data TXD signal.

Figure 7:
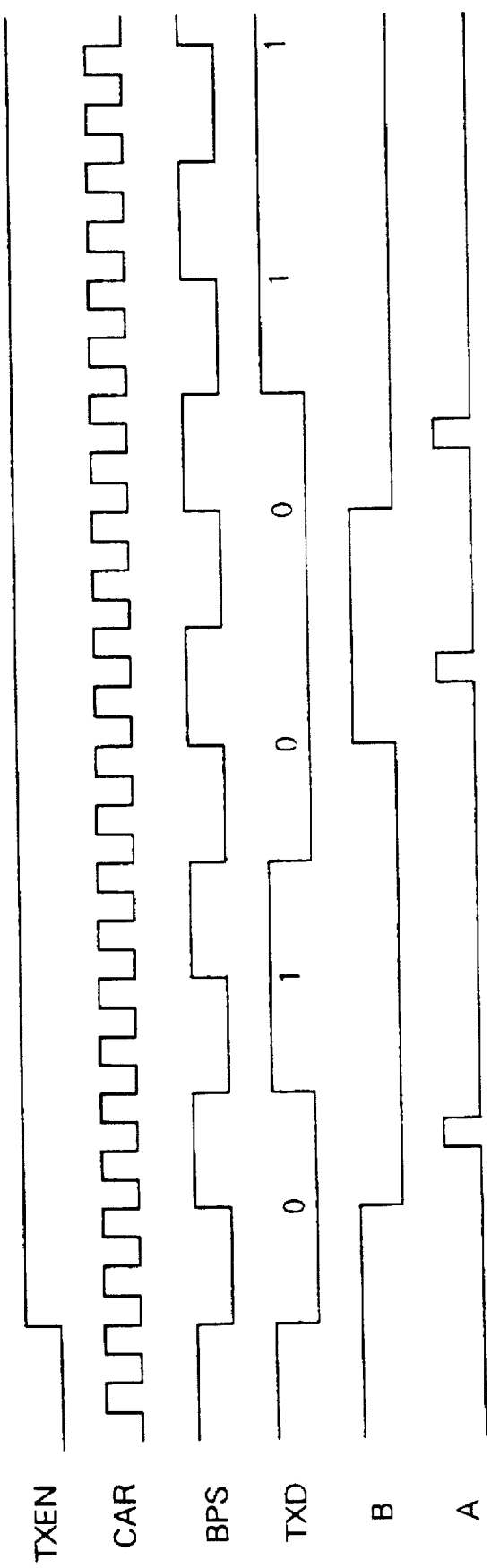
FIG. 7 is a time chart useful for explanation of an operation of the FIG. 6 modulation circuit.

After the reset release of the D-type flip-flop 515 due to the TXEN signal, when this division signal BPS rises, the D-type flip-flow 515 operates so that, in correspondence with the variation of the transmission data TXD signal, the output B of the D-type flip-flop 515 becomes as indicated by character B in FIG. 7. That is, when the transmission data TXD is "0", a signal that the "0/1" of the signal B inverts is obtainable. This signal is input into the same circuit as the circuit of section a. Further, since at this time the TXSEL switch 12 is connected with the GND, when the transmission data TXD is "0", a modulating signal as indicated by character A in FIG. 7 is obtainable from the output terminal A.

Although this embodiment has been described of the case that the PSK modulation is always conducted when the transmission data is "0", it is also possible that the modulation method (PSK modulation/FSK modulation) and modulation timing are respectively switched by changing over the PFSEL switch 11 and the TXSEL switch 12.

As described above, the non-contact type IC card according to this embodiment can select either the PSK modulation method or the FSK modulation method, and further can switch over the modulation timing for the transmission data. Accordingly, it is possible to realize one non-contact type IC card capable of suiting a number of data communication specifications.

Third Embodiment

Figure 8:
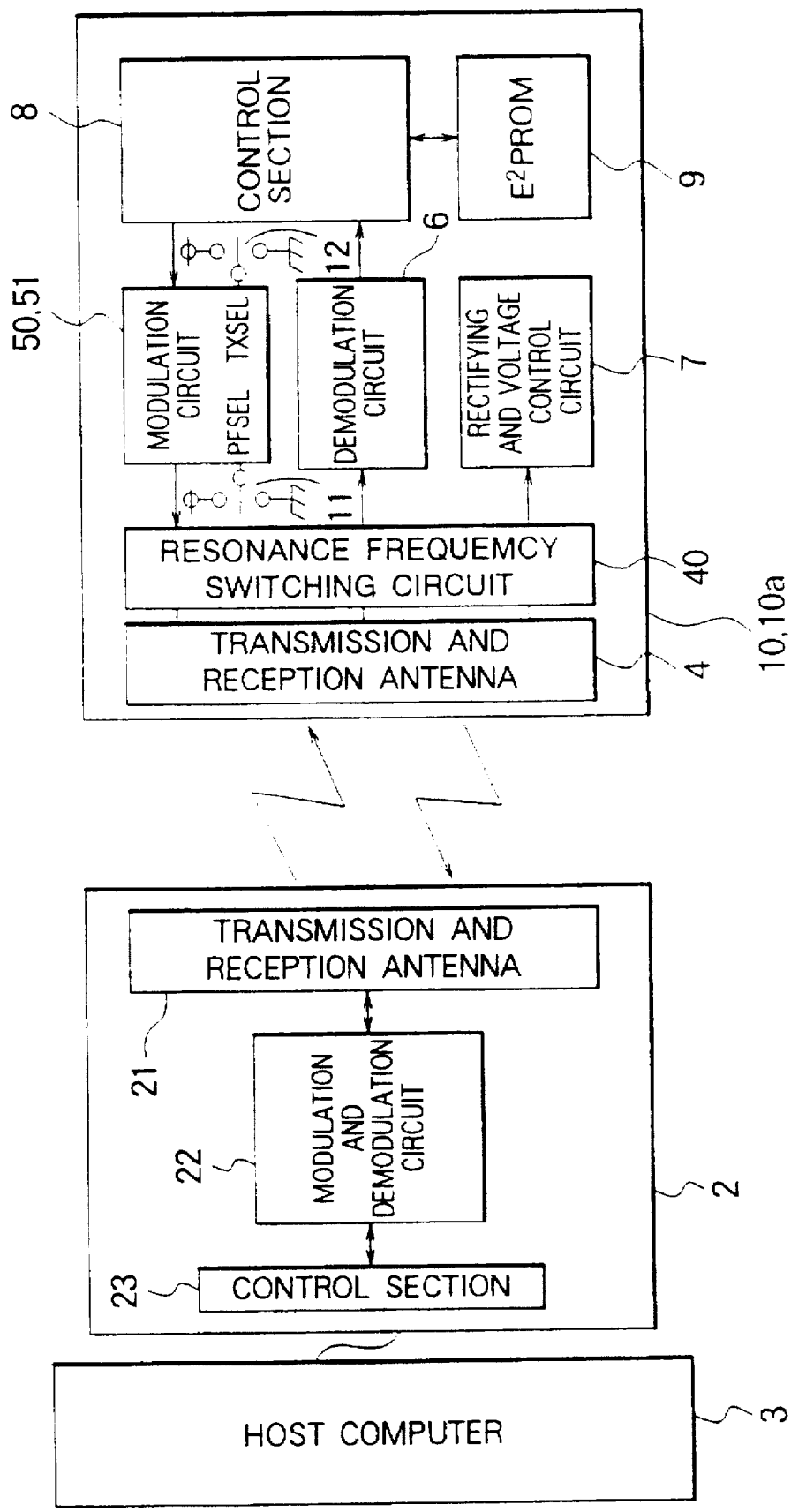
FIG. 8 is a block diagram showing an arrangement of a non-contact type IC card system according to a further embodiment of this invention.

FIG. 8 is a block diagram showing an arrangement of a non-contact type IC card system according to another embodiment of the present invention. The non-contact type IC card system according to this embodiment employs either the card 10 or 10a described in the first or second embodiment.

The description of the non-contact type IC card system is made in the case of using the card 10a according to the second embodiment. The card 10a is arranged such that the PFSEL switch 11 and the TXSEL switch 12 of the modulation circuit 51 are switched to the VDD or the GND in accordance with the modulation method taken in the system including the card and the modulation timing. Thus, the setting is selectively made to the PSK modulation method or to the FSK modulation method, and further selectively made to the method that the modulation method is conducted at the time that the transmission data inverts or to the method that the modulation is always carried out when the transmission data is "0".

When the card 10a matching with the system specification comes into the communication-allowable distance range for the R/W 2, the transmission and reception antenna 4 of the card 10a receives a radio wave from the R/W 2 and the rectifying and voltage control circuit 7 develops an operating voltage so that the transmission and reception of data starts. In the data transmission and reception methods, after the card 10a receives the operating voltage, the data transmission is performed from the R/W 2 to the card 10a and the card 10a decodes and processes the received data and transmits the processed result to the R/W 2.

Although the description of this embodiment has been taken in terms of the case of using the card 10a according to the second embodiment, even if using the card 10 according to the first embodiment, the data transmission and reception is possible with the similar procedure. The card 10 according to the first embodiment performs only the setting of the modulation method, i.e., the selection of one of the PSK modulation and the FSK modulation.

As described above, the non-contact type IC card system according to this embodiment can be designed to select as a modulation method one of the PSK modulation and the FSK modulation and also adopted to change over the modulation timing for the transmission data depending upon the kind of card, and hence the relationship between the R/W and the card is more flexible, which can realize a non-contact type IC card system expanded in its application range.

Fourth Embodiment

Figure 9:
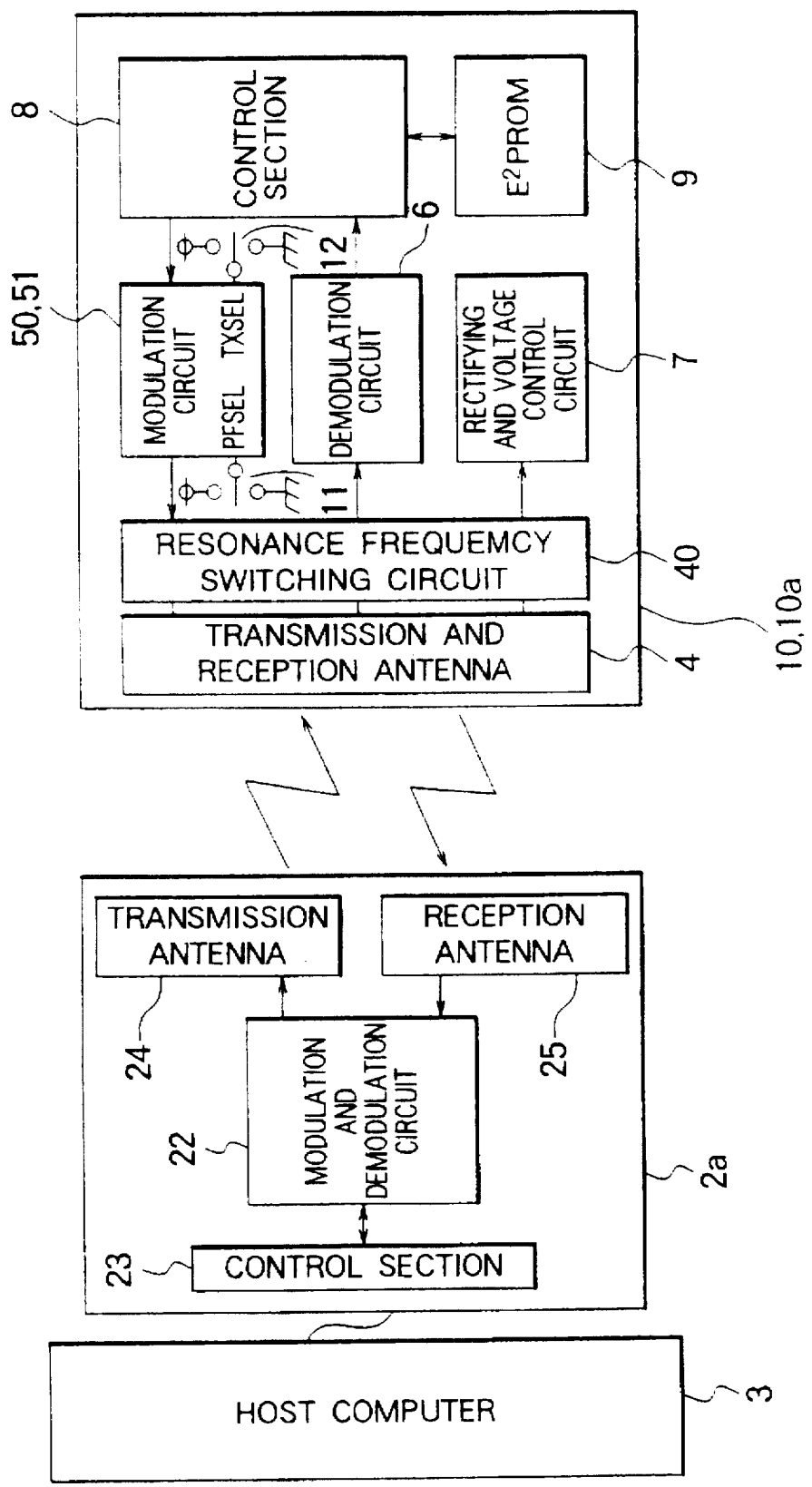
FIG. 9 is a block diagram showing an arrangement of a non-contact type IC card system according to a still further embodiment of this invention.

FIG. 9 is a block diagram showing an arrangement of a non-contact type IC card system according to another embodiment of the present invention. In the system according to this embodiment, the antenna means of the R/W 2a is divided into an antenna 24 for transmission and an antenna 25 for reception so that at the data transmission tl the card 10 or 10a the transmission data is modulated in a modulation and demodulation circuit 22 and transmitted as a radio wave from the transmission antenna 24 while at the data reception a radio wave transmitted is received through the reception antenna 25 and then demodulated in the modulation and demodulation circuit 22.

In the procedure of the data transmission and reception, according to the modulation method of the system, the PFSEL switch 11 of the modulation circuit 50 or 51 of the card 10 or 10a is connected with the VDD or the GND (if the system is also equipped with the TXSEL switch 12 for switching over the modulation timing, this switch is also operated), and when the card 10 or 10a enters the communication-allowable distance range of the R/W 2a, the transmission and reception antenna 4 of the card 10 or 10a receives a radio wave from the R/W 2a so that the rectifying and voltage control circuit 7 produces a VDD voltage (operating voltage) to start the transmission and reception of data.

In data transmission and reception, after the operating voltage actuates the card 10 or 10a, the data transmission from the R/W 2a to the card 10 or 10a initiates the decode and process of the received data to be implemented within the card 10 or 10a, with the processed result being transmitted from the card 10 or 10a to the R/W 2a.

In the non-contact type IC card system according to this embodiment, the antenna means is divided into the transmission antenna and the reception antenna, and consequently two kinds of antenna characteristics are obtainable for the transmission and reception, respectively. The transmission antenna has an antenna characteristic which can provide a transmission power, while the reception antenna has an antenna sensitivity accepting a weak radio wave, with the result that a non-contact type IC card system can be realized which is capable of data transmission and reception with a longer communication distance.

Fifth Embodiment

Figure 10:
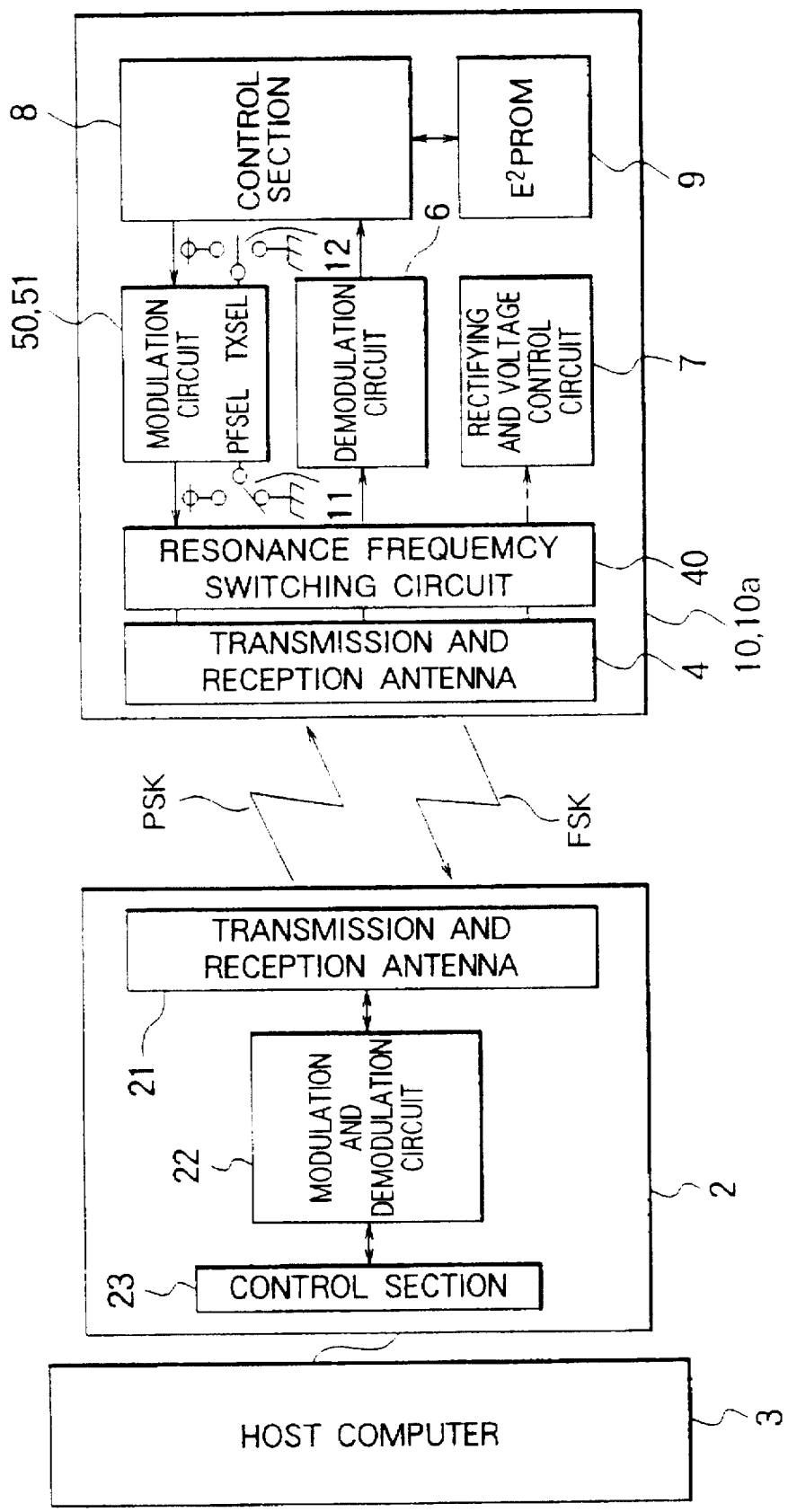
FIG. 10 is a block diagram showing an arrangement of a non-contact type IC card system according to a still further embodiment of this invention.

FIG. 10 is a block diagram showing an arrangement of a non-contact type IC card system according to a further embodiment of the present invention. In the system according to this embodiment, the data transmission from the R/W 2 to the card 10 or 10a is accomplished on the basis of the PSK modulation method, whereas the data transmission from the card 10 or 10a to the R/W 2 is achieved on the basis of the FSK modulation method in a state that the PFSEL switch 11 of the modulation circuit 50 or 51 is connected with the GND.

In the procedure for data transmission and reception, the PFSEL switch 11 of the modulation circuit 50 or 51 is connected with the GND (if the system is also provided with the TXSEL switch 12, the switch 12 is switched over to match with the system), and if the card 10 or 10a enters the communication-allowable distance range of the R/W 2, a radio wave from the R/W 2 is received through the transmission and reception antenna 4 of the card 10 or 10a so that the rectifying and voltage control circuit 7 creates an operating voltage to start data transmission and reception.

After the card 10 or 10a attains the operating voltage, the data transmission from the R/W 2 to the card 10 or 10a is done on the basis of the PSK modulation method and the card 10 or 10a demodulates, decodes and processes the received data, before the processed result is transmitted from the card 10, 10a to the R/W 2 on the basis of the FSK modulation.

In the non-contact type IC card system according to this embodiment, the data transmission from the R/W to the card is conducted in accordance with the PSK modulation method, while the data transmission from the card to the R/W is made in accordance with the FSK modulation method, with the result that there is no need for a complicated circuit for the FSK modulation method to be incorporated in the card, and when the demodulation method circuit within the card is designed to agree with the PSK modulation method, the size-reduction and cost-reduction of the card are possible, besides even a radio wave with a higher frequency is receivable because the R/W side carries out the demodulation method with respect to the FSK modulation method.

Sixth Embodiment

Figure 11:
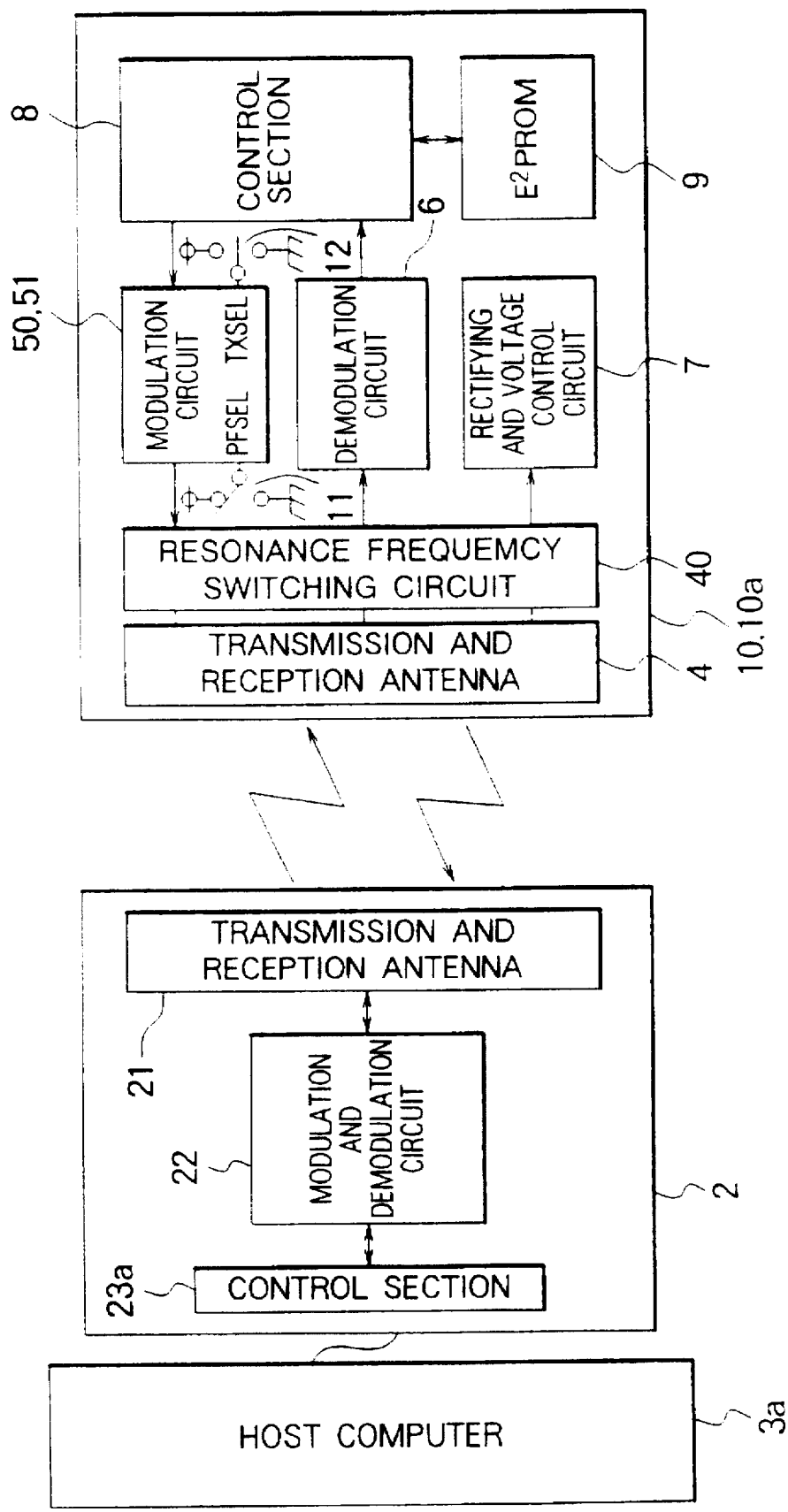
FIG. 11 is a block diagram showing one example of a system which carries out a data transmission method according to an embodiment of this invention.
Figure 12:
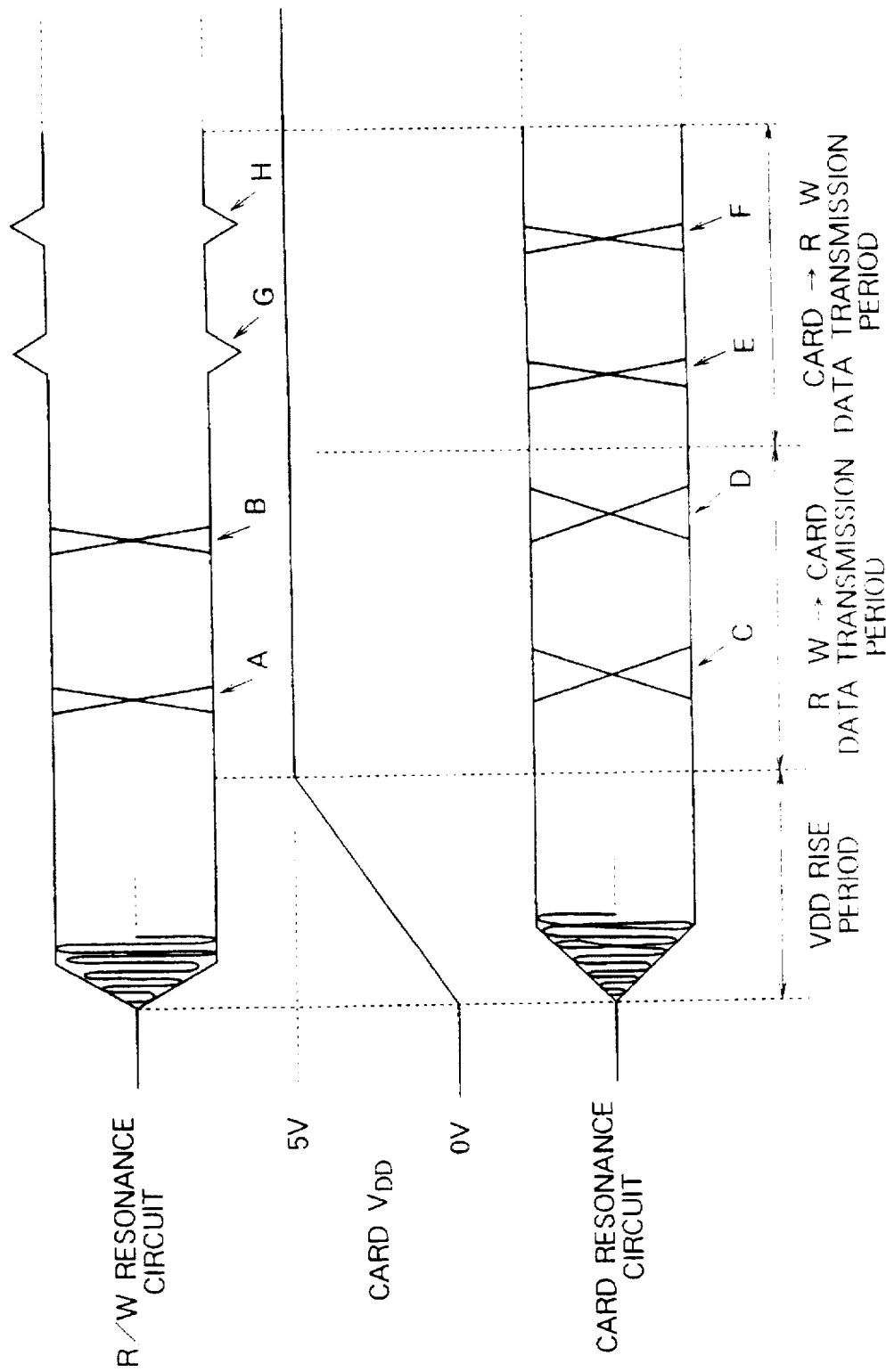
FIG. 12 is an illustration of waveforms useful for explaining an operation of the FIG. 11 system.

FIG. 11 is a block diagram showing an arrangement of a non-contact type IC card system which executes a data transmission method according to an embodiment of this invention, and FIG. 12 is an illustration of waveforms of signals taken at the data transmission and reception by the R/W and the card of this system. In this embodiment, after data transmission from the R/W 2 to the card 10 or 10a, the supply of a radio wave from the R/W 2 is continued even at data transmission from the card 10 or 10a to the R/W 2 so that the operating voltage (VDD) within the card 10 or 10a is always stable.

The particular difference of the FIG. 11 system from the aforementioned embodiments is that a program stored in a control section 23a of the R/W 2 or in a host computer 3a executes the operations to be described below.

In operation, the PFSEL switch 11 of the modulation circuit 50 or 51 of the card 10 or 10a is connected with, for example, the VDD side (if the system is also equipped with the TXSEL switch 12, at the same time the switch is operated in accordance with the system), so that data transmission and reception is accomplished on the PSK modulation. For the data transmission and reception between the R/W 2 and the card 10 or 10a, first the transmission and reception antenna 21 of the R/W 2 begins to transmit a radio wave. The card 10 or 10a receives the radio wave through its transmission and reception antenna 4, which radio wave is rectified in the rectifying and voltage control circuit 7. The rectifying and voltage control circuit 7 also develops the operating voltage VDD. This term constitutes the VDD rise time period in FIG. 12.

When the operating voltage VDD comes up to 5V, the card 10 or 10a and the R/W 2 enters the data transmission and reception allowable conditions, and hence the data transmission period from the R/W 2 to the card 10 or 10a starts. In accordance with the instruction from the host computer 3a, in the R/W 2 the control section 23a modulates the data using the modulation and demodulation circuit 22 and further transmits the data using the transmission and reception antenna 21. This data is received by the transmission and reception antenna 4 within the card 10 or 10a.

In FIG. 12, at the points A and B for the modulation in the R/W 2, the resonance circuit of the transmission and reception antenna 4 of the card 10 or 10a side also has deformed or distorted waveforms at points C and D. That data undergoes the demodulation in the demodulation method circuit 6 and further subjected to the process in the control section 8, whereby the data transmission from the R/W 2 to the card 10 or 10a takes place.

Subsequently, the data transmission period from the card 10 or 10a to the R/W 2 starts. In this embodiment, even after the completion of the data transmission from the R/W 2 to the card 10 or 10a, the data transmission from the card 10 or 10a to the R/W 2 is conducted while the supply of the signal (radio wave) to the card 10 or 10a continues, and hence the control section 23a of the R/W 2 continues to emit the radio wave from the transmission and reception antenna 21.

In this state, the control section 8 of the card 10 or 10a sends the transmission data to the modulation circuit 50 or 51 in accordance with the processed result of the received data from the R/W 2 in order to implement the PSK modulation in the modulation circuit 50 or 51. This is shown at the points E and F in FIG. 12. Since the resonance circuit of the transmission and reception antenna 21 of the R/W 2 continuously issues the signal, when the card 10 or 10a side modulates the data, the waveform is expanded as shown at the points G And H in FIG. 12, which allows the determination of the fact that the data has been subjected to the modulation.

Subsequently, the modulation and demodulation circuit 22 demodulates this waveform and supplies the control section 23a with the demodulated waveform which in turn, is fed to the host computer 3a. Thereafter, the data transmission and reception is completed with the repeated data transmission from the R/W 2 to the card 10 or 10a and data transmission from the card 10 or 10a to the R/W 2.

Although the description of the above embodiment has been made with respect to the PSK modulation method, the data transmission using the FSK modulation method is similarly workable.

In the data transmission method according to this embodiment, after the data transmission from the R/W to the card, even during the data transmission from the card to the R/W, the supply of radio wave continuously occurs, and therefore, the operating voltage VDD is always stable and the continuous data transmission and reception is possible, thus realizing a data transmission method capable of a high degree of-speed data communication with a high reliability.

Seventh Embodiment

Figure 13:
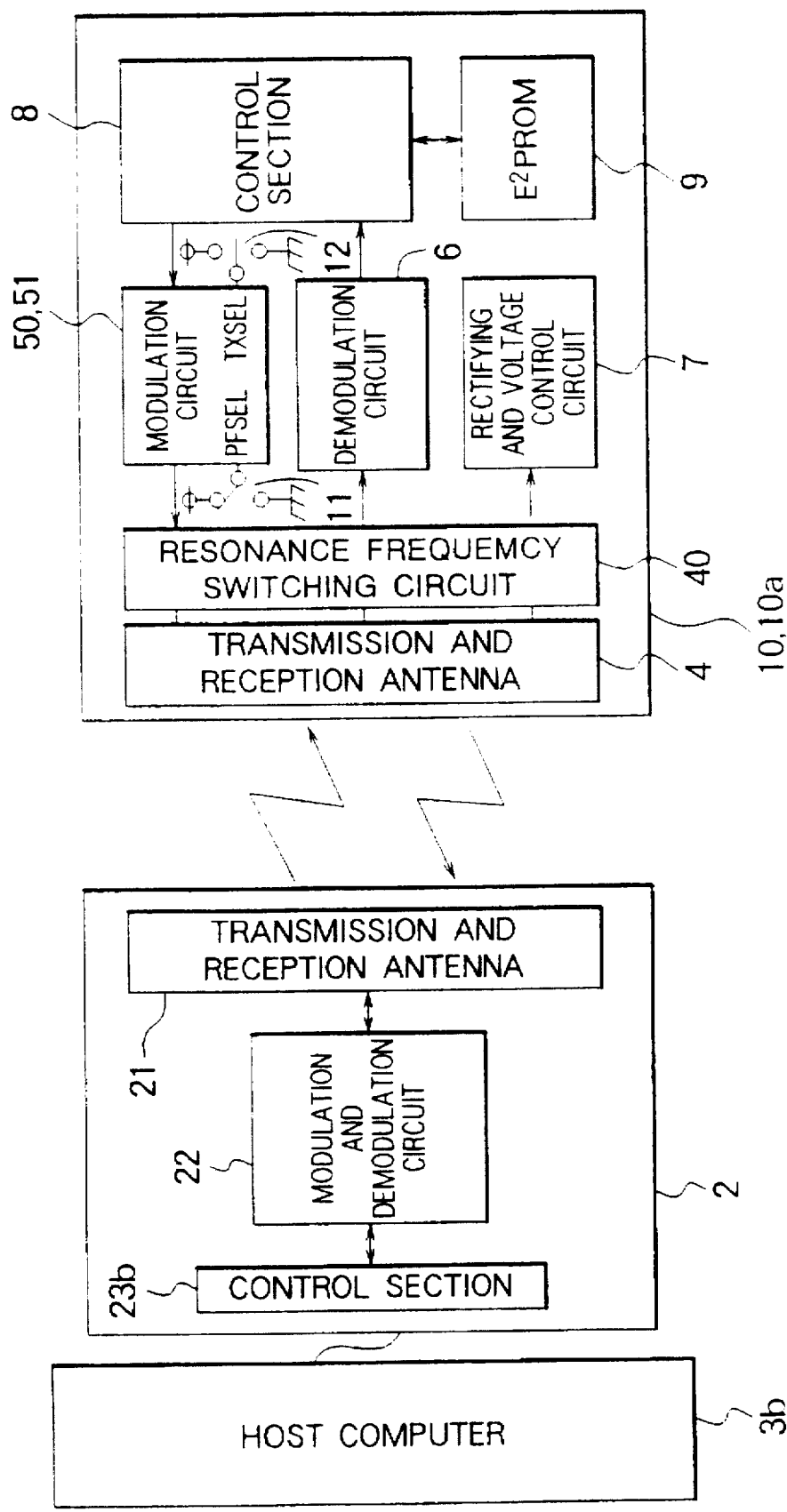
FIG. 13 is a block diagram showing one example of a system which carries out a data transmission method according to a different embodiment of this invention.
Figure 14:
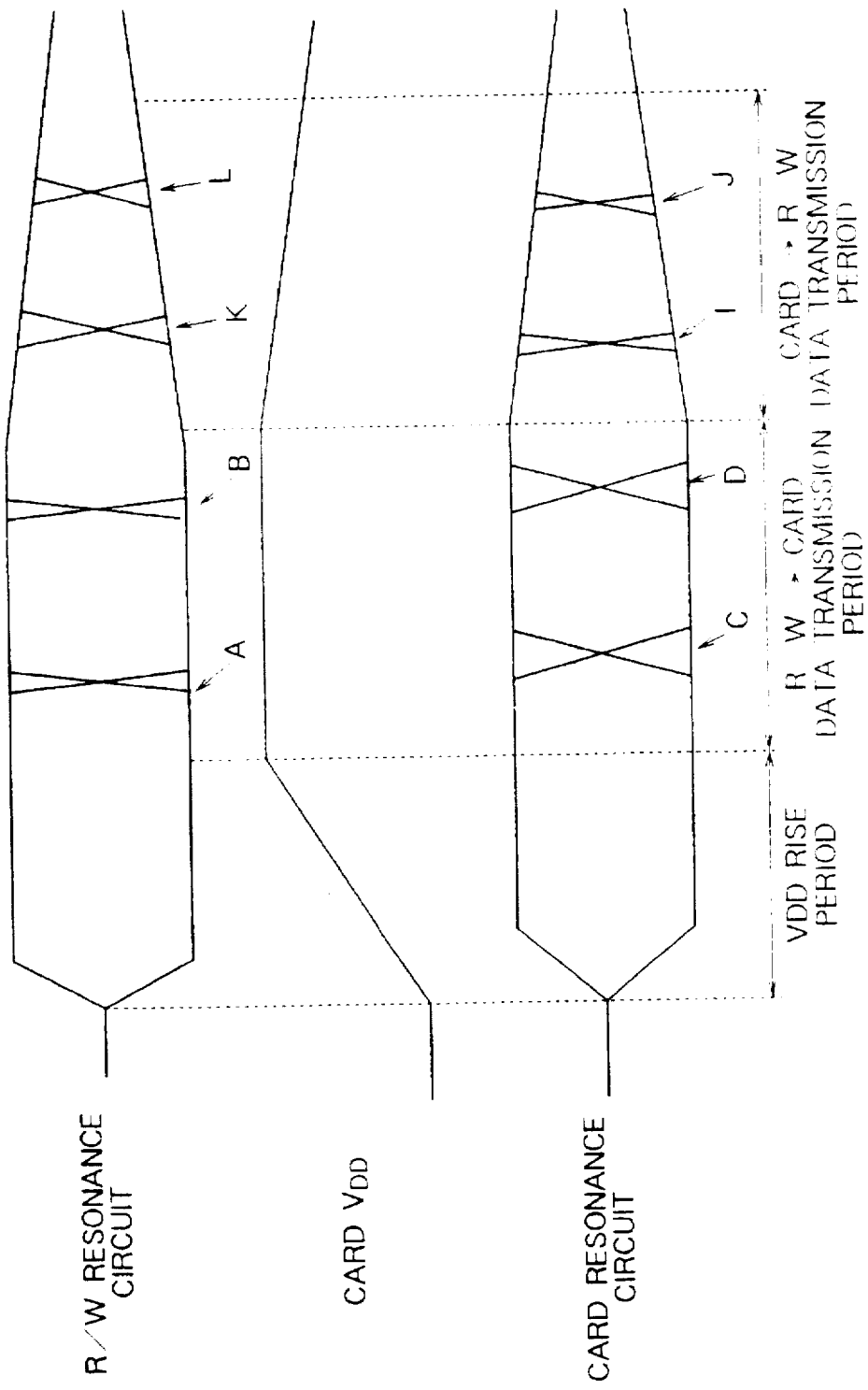
FIG. 14 is an illustration of waveforms available for description of an operation of the FIG. 13 system.
Figure 15:
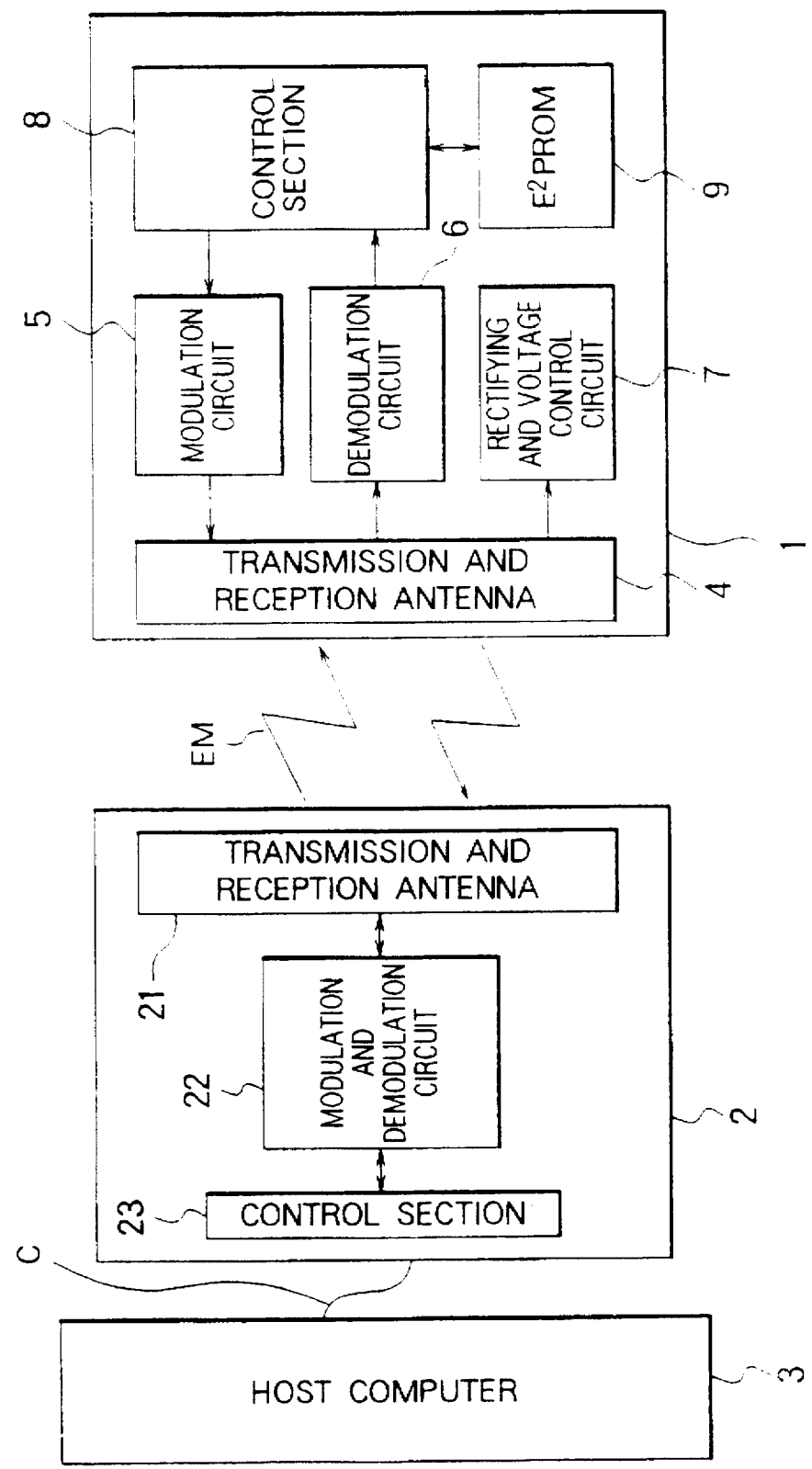
FIG. 15 is a block diagram showing an arrangement of a known non-contact type IC card system.
Figure 16:
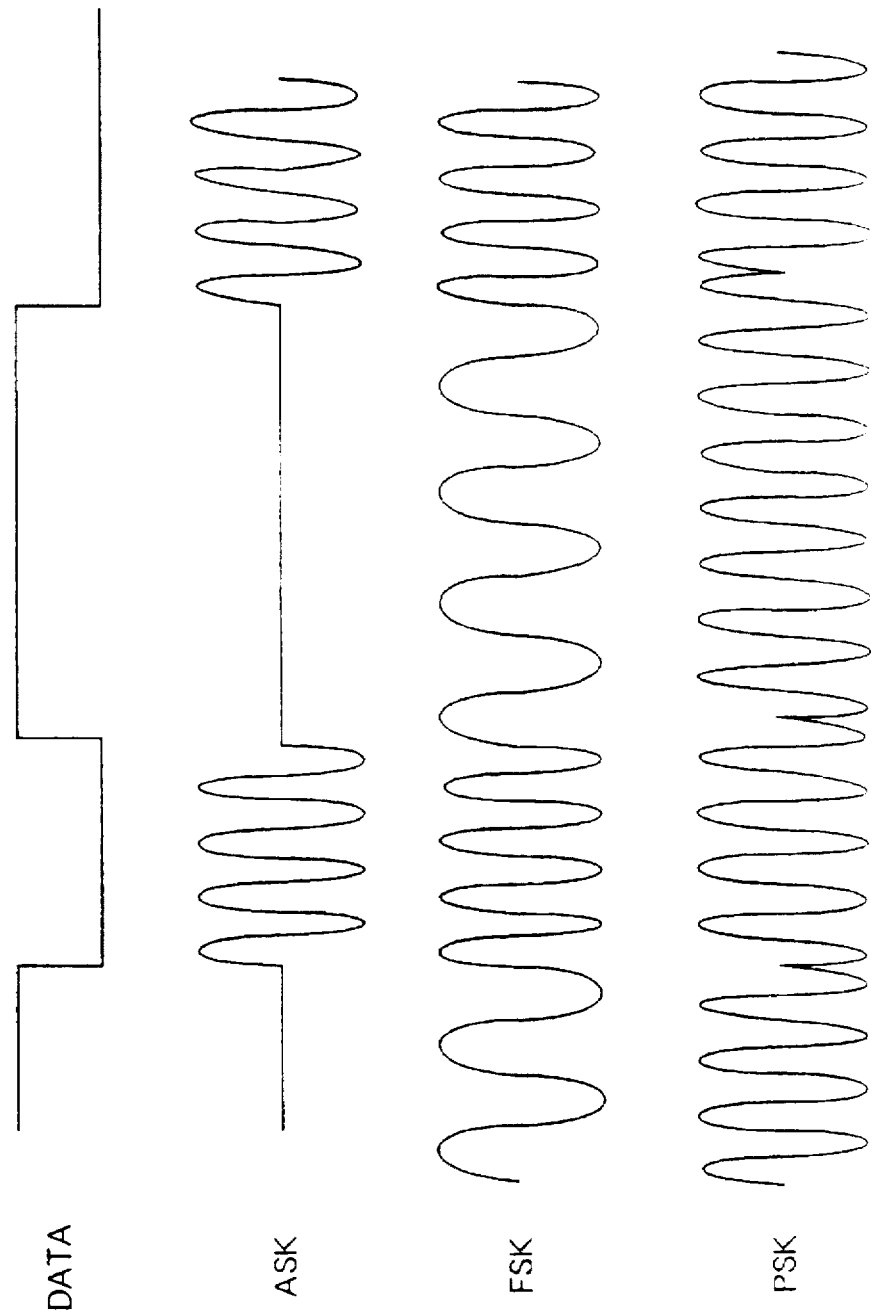
FIG. 16 is an illustration of waveforms useful for description of a modulation method for a non-contact type IC card.

FIG. 13 is a block diagram showing an arrangement of a non-contact type IC card system for carrying out a data transmission method according to a another embodiment of this invention, and FIG. 14 is an illustration of waveforms of signals at data transmission and reception between the R/W and the card in this system. In this embodiment, in the R/W 2, the resonance of the resonance circuit continues at the data transmission from the R/W 2 to the card 10 or 10a, while the supply of the radio wave stops at the data transmission from the card 10 or 10a to the R/W 2, with the result that even a weak radio wave from the card 10 or 10a to the R/W 2 becomes easily receivable in the R/W 2 side.

If an attempt is made to receive a weak radio wave from the card 10 or 10a in a state that a strong transmission power from the R/W 2 is in supply, the weak radio wave is subject to be absorbed into the strong radio wave for the transmission from the R/W 2 to the card 10 or 10a so that difficulty is encountered to discriminate or distinguish the weak radio wave.

The difference of the FIG. 13 system from the above-described embodiments is that a program built in the control section 23b of the R/W 2 or a host computer 3a implements the operation which will be described below.

In operation, the PFSEL switch 11 of the modulation circuit 50 or 51 of the card 10 or 10a is coupled to, for example, the VDD side (if the system is also provided with the TXSEL switch 12, at the same time the switch is changed over in accordance with the system), so that data transmission and reception is implemented on the basis of the PSK modulation method. The data transmission and reception between the R/W 2 and the card 10 or 10a starts with the transmission of a radio wave from the transmission and reception antenna 21 of the R/W 2. In the card 10 or 10a, the transmission and reception antenna 4 receives that radio wave and the rectifying and voltage control circuit 7 rectifies it to produce the operating voltage VDD. This is accomplished during the VDD rise period in FIG. 14.

When the operating voltage VDD reaches 5V, the card 10 or 10a and the R/W 2 enter into the data transmission allowable condition, and the data transmission period from the R/W 2 to the card 10 or 10a starts. In accordance with the instruction from the host computer 3b, in the R/W 2 the control section 23b modulates the data in the modulation and demodulation circuit 22 and sends the modulated data through the transmission and reception antenna 21. This data is received through the transmission and reception antenna 4 of the card 10 or 10a.

In FIG. 14, at the points A and B for the modulation in the R/W 2, the resonance circuit of the transmission and reception antenna 4 of the card 10 or 10a side also has deformed or distorted waveforms at points C and D. That data is subjected to the demodulation in the demodulation circuit 6 and further subjected to the process in the control section 8, whereby the data transmission from the R/W 2 to the card 10 or 10a takes place.

Subsequently, the data transmission period from the card 10 or 10a to the R/W 2 starts. In this embodiment, after the completion of the data transmission from the R/W 2 to the card 10 or 10a, the supply of the signal (radio wave) to the card 10 or 10a stops, while the data transmission from the card 10 or 10a to the R/W 2 is carried out. Accordingly, the operating voltage VDD in the card 10 or 10a starts to decrease from 5V. In addition, the resonance attenuation of the resonance circuit of the card 10 or 10a begins.

In this embodiment, in this attenuation state the data transmission is conducted from the card 10 or 10a to the R/W 2. For example, until the operating voltage VDD attenuates from 5V up to 2.5V, the data transmission from the card 10 or 10a to the R/W 2 continues. In this attenuation period, the control section 8 of the card 10 or 10a supplies the transmission data to the modulation circuit 50 or 51 to carry out the PSK modulation method therein. This is shown at the points I and J in FIG. 14. The resonance circuit of the transmission and reception antenna 21 of the R/W 2 also stops the signal supply and receives the modulated data during the attenuating oscillation, whereby the waveform is distorted as shown at the points K and L in FIG. 14. From this, the R/W 2 determines the fact that the data has undergone the modulation.

Furthermore, this waveform is demodulated in the modulation and demodulation circuit 22 and then input into the control section 23b, before being supplied to the host computer 3b. In this system, in a case where, after the completion of one data transmission and reception, the data transmission and reception is again carried out, the operation restarts from the VDD rise period due to the supply from the R/W 2 to the card 10 or 10a, and the data transmission and reception is re-performed after the operating voltage VDD in the card 10 or 10a is set to 5V.

Although the description of this embodiment has been made in terms of the PSK modulation method, the data transmission using the FSK modulation method is possible in the same manner.

The data transmission according to this embodiment is particularly effective in the case that, since the distance between the card and the R/W is long, the data transmission power from the R/W needs to be strong, and the transmission power from the card is weak because of the long distance. The transmission power from the R/W is stopped at the time of the transmission from the card to the R/W conducted after the completion of the transmission from the R/W to the card, by which a data transmission method can be realized which is capable of facilitating the reception of a weak radio wave from the card side in the R/W side.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A non-contact IC card, using electromagnetic waves as a communication medium, comprising:

antenna means for transmitting and receiving data, the antenna means having a resonant frequency;

a modulation circuit for PSK modulation and FSK modulation of data to be transmitted through the antenna means and producing an output signal;

a resonant frequency switching circuit coupled to the antenna means and the modulation circuit for varying the resonant frequency of the antenna means in response to the output signal;

PSK/FSK switching means coupled to the modulation circuit for switching the modulation circuit between a first state for PSK modulation and a second state for FSK modulation;

demodulation means coupled to the resonant frequency switching circuit for demodulating data received through the antenna means; and control means coupled to the modulation circuit and the demodulation means for controlling the antenna means, the modulation circuit, and the PSK/FSK switching means in response to the data demodulated by the demodulation means.

2. The non-contact IC card according to claim 1, wherein the modulation circuit includes:

a first modulating section for PSK modulation and FSK modulation at a first modulation timing;

a second modulating section for PSK modulation and FSK modulation at a second modulation timing; and modulation timing switching means for changing the modulation timing by switching between the first and second modulating sections.

3. A non-contact IC card system comprising:

a non-contact IC card, using electromagnetic waves as a communication medium, including:

first antenna means for transmitting data to and receiving data from a reader/writer, the first antenna means having a resonant frequency;

a modulation circuit for PSK modulation and FSK modulation of data to be transmitted through the antenna means and producing an output signal;

a resonant frequency switching circuit coupled to the antenna means and the modulation circuit for varying the resonant frequency of the antenna means in response to the output signal;

PSK/FSK switching means coupled to the modulation circuit for switching the modulation circuit between a first state for PSK modulation and a second state for FSK modulation;

demodulation means coupled to the resonant frequency switching circuit for demodulating data received through the antenna means; and control means coupled to the modulation circuit and the demodulation means for controlling the antenna means, the modulation circuit, and the PSK/FSK switching means in response to the data demodulated by the demodulation means; and a reader/writer including:

second antenna means for transmitting data to and receiving data from the non-contact IC card;

modulation and demodulation means coupled to the second antenna means for modulating data transmitted and demodulating data received through the second antenna means; and control means coupled to the modulation and demodulation means for controlling the modulation and demodulation means.

4. The non-contact IC card system according to claim 3, wherein the modulation circuit includes:

a first modulating section for PSK modulation and FSK modulation at a first modulation timing; and a second modulating section for PSK modulation and FSK modulation at a second modulation timing; and modulation timing switching means for changing the modulation timing by switching between the first and second modulating sections.

5. The non-contact IC card system according to claim 3, wherein the second antenna means comprises a first antenna for data transmission and a second antenna for data reception.

6. The non-contact IC card system according to claim 3, wherein the reader/writer employs PSK modulation in transmitting data to the non-contact IC card and the non-contact IC card employs FSK modulation in transmitting data to the reader/writer.

7. The non-contact IC card system according to claim 4, wherein the reader/writer employs PSK modulation in transmitting data to the non-contact IC card and the non-contact IC card employs FSK modulation in transmitting data to the reader/writer.

8. The non-contact IC card system according to claim 5, wherein the reader/writer employs PSK modulation in transmitting data to the non-contact IC card and the non-contact IC card employs FSK modulation in transmitting data to the reader/writer.

9. A data communication method for a non-contact type IC card system comprising a non-contact type IC card employing PSK and FSK modulation, and a reader/writer, the method comprising:

continuously transmitting a power signal from a reader/writer to a non-contact IC card, the non-contact IC card employing FSK and PSK modulation of data;

rectifying the power signal in the non-contact IC card to generate an operating voltage in the non-contact IC card;

transmitting a first data signal including at least one of FSK and PSK modulated data from the reader/writer to the non-contact IC card after generation of the operating voltage; and, in response to the first data signal, transmitting a second data signal including at least one of FSK and PSK modulated data from the non-contact IC card to the reader/writer during transmission of the power signal.

10. A data communication method for a non-contact IC card system comprising a non-contact IC card employing PSK and FSK modulation of data and a reader/writer, the method comprising:

transmitting a power signal from a reader/writer to a non-contact IC card, the non-contact IC card employing FSK and PSK modulation of data;

rectifying the power signal in the non-contact IC card to generate an operating voltage;

transmitting a first data signal including at least one of FSK and PSK modulated data from the reader/writer to the card after generation of the operating voltage;

in response to the first data signal, transmitting a second data signal, including at least one of FSK and PSK modulated data, from the non-contact IC card to the reader/writer; and stopping transmission of the power signal during transmission of the second data signal.

11. The non-contact IC card according to claim 1 wherein the resonant frequency switching circuit comprises a capacitor and a transistor coupled to the capacitor for coupling and decoupling the capacitor to and from the antenna means in response to the output signal.

12. The non-contact IC card as claimed in claim 3 wherein the resonant frequency switching circuit comprises a capacitor and a transistor coupled to the capacitor for coupling and decoupling the capacitor to and from the antenna means in response to the output signal.

13. The data communication method of claim 9 wherein transmitting the second data signal comprises varying a resonant frequency of an antenna of the non-contact IC card by coupling and decoupling a capacitor to and from the antenna.

14. The data communication method of claim 10 wherein transmitting the second data signal comprises varying a resonant frequency of an antenna of the non-contact IC card by coupling and decoupling a capacitor to and from the antenna.

* * * * *